June 30, 1970  G. B. TRUCHELUT ET AL  3,518,000
DEFOLIATION EVALUATION METHOD
Filed Feb. 3, 1967  2 Sheets-Sheet 1

INVENTORS
George B. Truchelut
Charles M. Bartlett

BY Harry M. Saragovitz,
Edward J. Kelly, Herbert Berl
& Muzio B. Roberto
ATTORNEYS United States Patent Office  3,518,000
Patented June 30, 1970

3,518,000
DEFOLIATION EVALUATION METHOD
George B. Truchelut, Frederick, Md., and Charles M. Bartlett, Fort McClellan, Ala., assignors to the United States of America as represented by the Secretary of the Army
Filed Feb. 3, 1967, Ser. No. 614,532
Int. Cl. G01n 21/06, 21/22, 21/20
U.S. Cl. 356—72                                    1 Claim

ABSTRACT OF THE DISCLOSURE

A method of selecting a plot of forest, photographing the forest canopy, treating the forest with a chemical, photographing the forest canopy at the same location, comparing the photographic images of the forest canopies by the impingement of a collimated beam of light through the photographic images upon a photoelectric cell and measuring the generated current.

An apparatus having a light source with reflector, condensing lenses, and heat absorbing glass such that a uniform beam of parallel light rays is produced. The beam passes through the photographic image of the forest canopy being evaluated. The transmitted light then impinges on a photoelectric cell to produce a current. The current is measured by any suitable device.

---

The invention described herein may be manufactured and used by or for the Government of the United States of America for governmental purposes without the payment to us of any royalty thereon.

This invention relates in general to a defoliation evaluation method and evaluation meter therefore and more particularly to a method and evaluation meter having utility in the evaluation of the effectiveness of chemical products or compositions used in the defoliation of woody perennial plants.

The expression, "obscurimeter," as used herein designates an apparatus utilized to evaluate vertical photographs taken of test plots of forest canopy to determine the effectiveness of chemical defoliants.

Generally, forest and brush defoliation and kill, are evaluated visually. An individual surveys the treated area at scheduled intervals and estimates the effectiveness of the treatment. The evaluation is based on percentage defoliation of overall vegetation and of the component dominant, i.e., top layer of the forest, intermediate, shrub, and ground-cover layers. In addition, the defoliation and regrowth of individually marked trees and shrubs are also considered in the estimated evaluation. While experience leads to a somewhat more consistent ocular estimate than is possible with no previous basis for judgment, it has been found that even with practice the obtainment of a precision better than ± ten percent is unlikely.

In addition, the effectiveness of chemical treatments in the defoliation of plants have been evaluated utilizing aerial photographic means, i.e., changes in air-to-ground visibility. This technique requires the placement of some type of a large number of reflective markers or targets on or near the ground and under the trees which are to undergo the defoliation treatment. The forest is then subjected to the chemical treatment and the targets are observed aerially, i.e., by photographic means, at specific intervals. A comparison is made between the area of targets visible prior to treatment and the area of target visible after treatment to arrive at the effectiveness of the treatment. The utilization of the air-to-ground visibility method requires the placement and maintenance of numerous visible targets on the ground. The maintenance of said targets over a long period of time may present a serious problem. In addition, the cost of operating photographic reconnaisance aircraft is high.

By the utilization of the present invention, i.e., vertical photographic method in combination with the valuation means, the above shortcomings of the visual estimation and the air-to-ground visibility method are obviated. By comparison with the visual observation method, the vertical photographic method yields data which is subject to an inherent error of about ± three percent, excluding sampling errors. Furthermore, a permanent photographic record is produced which can be reviewed at any subsequent time if human mistakes are suspected. As a result of the review of the photographic record, most mistakes previously made may be corrected. In addition to the obtainment of reproducible results in the evaluation of the effectiveness of chemical defoliants, the present defoliation evaluation method and evaluation means therefore is relatively inexpensive in comparison to the utilization of aerial photographic means. No ground targets or markers are required. In addition, the need for expensive aircraft, aerial photographic equipment, and flight crews are obviated.

It is an object of the invention to provide and disclose a simple and inexpensive vertical photographic method for the evaluation of the effectiveness of chemical compositions utilized in the defoliation of woody perennial plants.

It is a further object of the invention to provide and disclose an accurate vertical photographic method for the evaluation of the effectiveness of chemical compositions utilized in the defoliation of woody perennial plants.

It is a further object of the invention to provide and disclose a device for the evaluation of vertical photographs taken of foliage which has been subjected to chemical treatment.

Other objects and a further understanding of the invention may be had by referring to the following description and claim taken in conjunction with the accompanying drawing in which:

The evaluation was commenced by selecting several test sites each comprising a rectangular plot of ground 300 feet by 1500 feet in dimension. A representative test plot consisted of an intermediate between evergreen rain forest and deciduous monsoon forest. Many species characteristic of each type were found in the test area. The forest in the area was divided roughly into three layers or strata. The overstory or dominant canopy consisted of rather scattered, very large deciduous trees. Species in this upper level included: *Mansonia gagei, Disopyros coaetanae, Lagerstroemia floribunda,* and *L. loudonii*.

The intermediate layer consisted mostly of broad-leaved evergreen species ranging from thirty to about eighty feet in height. Species included: *Streblus zeylanica, Cleistanthus dasyphyllus, Celtis collinsae*.

The understory of small trees and shrubs included *Grewia* sp., *Mitrephora* sp., *Mitragyna* sp., along with smaller specimens of thorny *Streblus zeylanica* that formed dense thickets in places.

Figure 1:
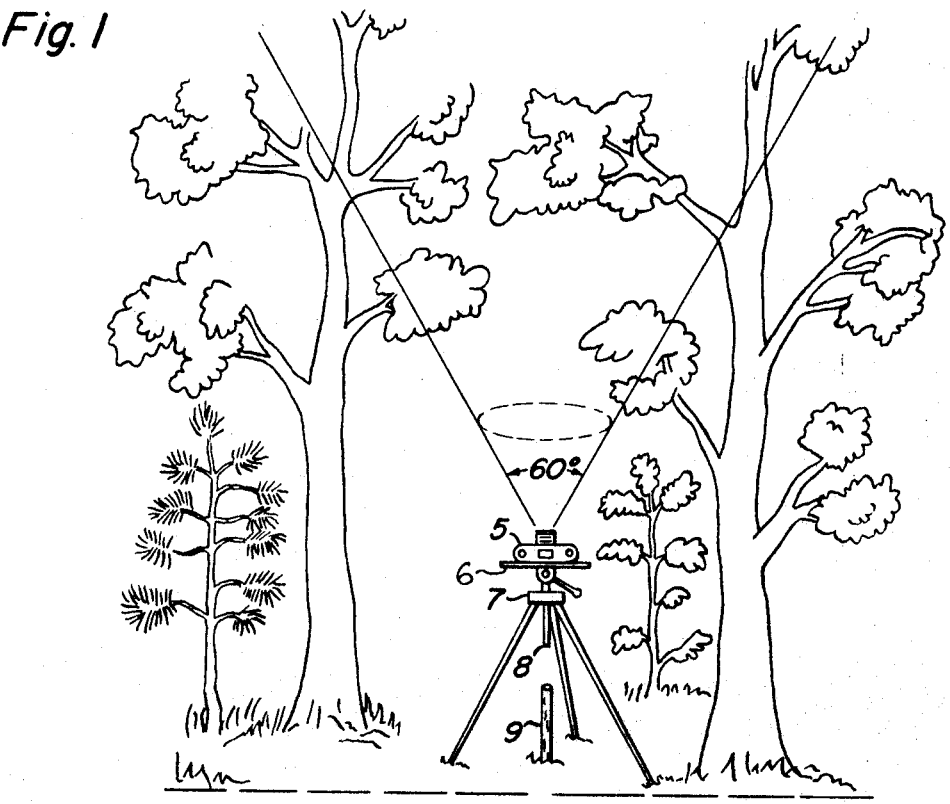
FIG. 1 shows a camera in position for the taking of a vertical photograph of the forest canopy.

After the test plots were selected, a very high contrast photograph of the forest canopy was made with the sky as a background at six marked locations in each plot as shown in FIG. 1. The specific locations were marked by driving stake 9 into the ground. The test plots were then subjected to chemical treatment. Identical contrast photographs were then made at exactly the same location at specific time intervals to obtain a comparison of the forest canopy by aligning tripod center shaft 8, which comprises an elongated cylindrical configuration extending downwardly from camera 5, with stake 9. After development, the photographs were evaluated by means of the obscurimeter, which is a subject of the present invention and described later. A value designated as percent obscuration was arrived at which connotes the photographic percent of the sky obstructed by plant foliage.

The camera used was Nikon F, single lens reflex 35 mm., with a "waist-level" finder supported on tripod 7 in FIG. 1. This camera was chosen because of its precision construction and rugged durability, although any camera of similar design could have been used. The 35 mm. lens was chosen as a compromise in the choice of the angle of acceptance which determines the area in the field of view, i.e., 60°. The tripod comprised specially made top plate 6 to hold the camera vertical, including necessary leveling indicators. Each series of repeat photographs were carefully made at exactly the same marked spot with the camera adjusted on the tripod so that the lens axis was in a precisely vertical position. A Weston Master III exposure meter was used. A compass was used to enable proper orientation of the camera axis consistently in the same direction throughout the series of photos.

The negatives obtained were high contrast silhouettes of the upper canopy, in which the white and black areas represented obscuration and visibility, respectively. Exposures were chosen so that the sky, as background, was rendered dense black in the negative, while the forest cover was very drastically underexposed, thus producing a black sky and white silhouette of the foliage and upper branch framework.

Field procedure consisted of beginning the film strip photograph of a sign containing the film roll number, date, and plot number. An exposure was made of the open sky, with shutter speed and aperture set as determined by the exposure meter to give a normally dense sky image. The same shutter and diaphragm settings were used for duplicate negatives exposed at the six camera sites in each plot. An unexposed frame and an open sky exposure were included for obscurimeter calibration of each roll.

Negative development was carefully standardized to secure uniform high contrast. All negative strips were processed in groups of two or three in fresh Kodak D-19 developer. After one use the developer could be used for other film, but was not used again for defoliation photographs. Kodak D-19 is a maximum contrast developer. When fresh solution was used, it produced a uniform density with black sky image, and very little image of the underside of the leaf canopy. Thus the negatives produced were black and clear only with little or no grey tones. Such careful processing control is necessary to obtain uniformity of data over a long period of time. For the same reason, film speed settings and handling of the exposure meter and camera in the field should be standardized with as little human variation as possible.

The film strips were measured with the obscurimeter to obtain a transmittance value for each negative. Fundamentally, the instrument comprises a light source with reflector, condensing lenses, and a heat absorbing glass such that a uniform beam of parallel light rays of approximately 1" diameter cross section is produced. This beam is passed through the photographic image of the plot canopy being measured. The transmitted light then impinges on a photoelectric cell to produce a current which is proportional to the ratio of light and dark areas on the film. The current is measured by a milliammeter.

Figure 2:
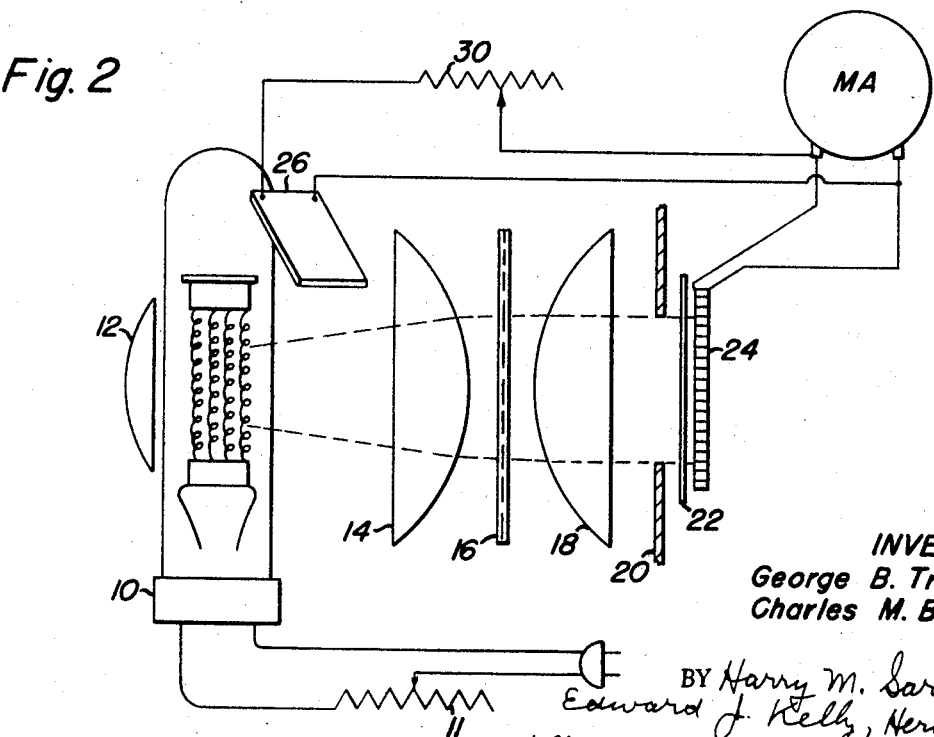
FIG. 2 shows a diagram of the evaluation meter.

Referring now to FIG. 2, for a specific example of the photographic evaluation means of the invention, the present obscurimeter comprises a vertically mounted light source 10 which consists of a 100 watt 115 volt projection lamp wired in series with resistor 11, e.g., a cylindrical wire wound rheostat, which can be adjusted to regulate the light output. This adjustment is used in compensating for variation in light absorption of the film base and emulsion due to storage or processing causes. Resistor 11 is connected in turn to a conventional source of power. The beam of light from lamp 10 is collimated by means of spherical reflector 12 in combination with condenser lenses 14 and 18. The spherical reflector 12 is positioned behind lamp 10 and in close proximity thereto. Condenser lenses 14 and 18, each comprising an identical convex shaped surface and an identical flat surface, are positioned in front of lamp 10 with the convexly shaped surfaces toward each other. The condensing lenses may be constructed of any suitable transparent material, e.g., glass. Glass heat, i.e., infrared, absorber 16 is interspersed between lenses 14 and 18 to protect the film from damage by these wave lengths emanating from the light source. Positioned in front of the flat surface of condensing lens 18 is diaphragm 20 which comprises an aperture extending therethrough so as to permit the passage of light upon film 22. The purpose of the diaphragm is to shield the film and photocell from any extraneous light waves. The size of the aperture extending through diaphragm 20 is equal to the diameter of the circular area to be measured on each photograph. Diaphragm 20 may be constructed of any suitable material which inhibits the passage of light waves therethrough, e.g., aluminum or brass. Positioned behind film 22 is photoelectric cell 24. A selenium photoelectric cell was utilized and found satisfactory. The current produced on the photoelectric cell is measured by a milliammeter which is calibrated from 0 to 100 in intervals of 2. The scale on the milliammeter is read as percent transmittance. An additional electrical circuit comprising photoelectric cell 26 is positioned near light source 12 and connected in reverse to the milliammeter through resistor 30. This produces a bucking or dark current which permits adjusting the meter to read zero when a zero transmittance reference frame is placed in position. This circuit is necessary because all so called "zero transmittance" frames cannot be made black enough to provide actual zero transmittance without running into film over-exposure troubles. Therefore the dark current circuit provides a means of "zeroing" the instrument on the black sky frame and at the same time compensating for small variations in sky frame density from one film strip to another.

Prior to its use in experimental evaluations, the obscurimeter was calibrated against a film strip made from a series of charts. The charts consisted of segmented circles corresponding to the circular field used in each canopy photograph. The circle areas were divided radially in 10 percent increments into various ratios of black and white segments from 0 percent black, e.g., all white, to 100 percent black. In addition, some charts were made with the same areas ratios, but with different patterns. The charts were photographed on a film strip, following all herein discussed conditions of exposure and development, and measured with the obscurimeter. Following measurement of transmittance of the film strip of the circular charts, a calibration curve was drawn and used in the evaluation of all plot film strip.

Figure 3:
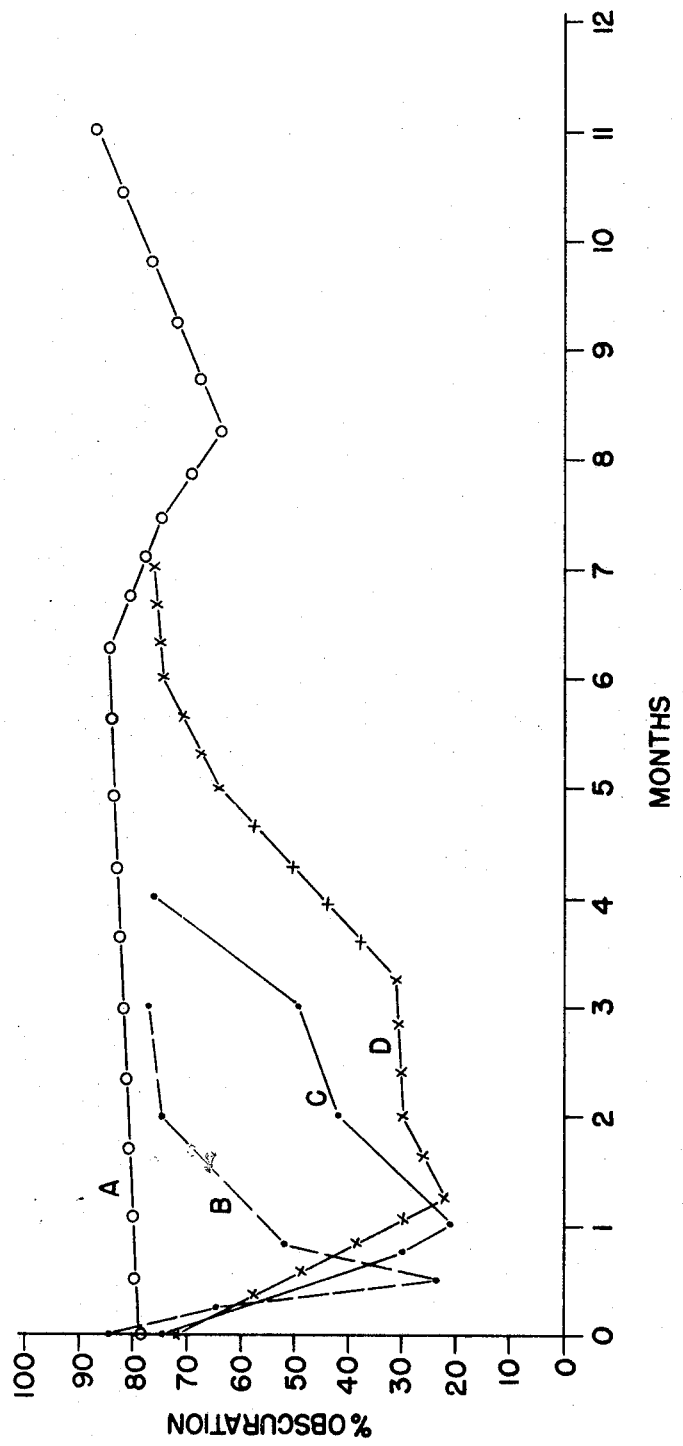
FIG. 3 shows a graphic representation of the effect of chemical treatment of plant foliage.

Obscuration values for the six individual camera stations in each test plot were graphed as percent obscuration vs. time in months to facilitate compilation of severity and duration of response data as shown in FIG. 3. One data series, i.e., chemical composition and amount thereof, utilized from each of several treatment plots and an untreated plot, was composited to show that the data obtained from the method and evaluation means accurately reflects treatment responses.

Line A of FIG. 3 represents the evaluation of an individual untreated test plot of forest in accordance with the present invention for a period of 11 months. The percent obscuration remained approximately constant for a period of around six months. Shortly thereafter, the dry season commenced and a low point was reached at approximately the eighth month, which reflects natural leaf fall.

Line B of FIG. 3 illustrates the percent obscuration vs. time of an individual test plot of forest which has been treated with 1:1 ethylene-2:2' dipyridylium dibromide. The chemical is a desiccant and causes rapid defoliation when applied to the foliage of the test plot. The chemical was applied at the rate of 2.7 lbs. per acre. The test plot was photographed and evaluated in accordance with the present invention. The percent obscuration decreased to around twenty-three percent after two weeks.

Line C of FIG. 3 illustrates the percent obscuration vs. time of individual test plot of forest which have been treated with cacodylic acid. The acid acts as a desiccant and when applied to foliage causes rapid defoliation. The chemical was applied to the plot undergoing treatment in an aqueous solution at the rate of 4.5 lbs. per acre. The test plot was photographed and evaluated in accordance with the present invention. The percent obscuration decreased to around twenty-one percent, one month after treatment.

Line D of FIG. 3 illustrates the precent obscuration of an individual test plot of forest which had been treated with 2,4,5-trichlorophenoxy acetic acid. The ester, which acts as a herbicide, was applied at the rate of 8.6 lbs. per acre. The precent obscuration decreased to approximately twenty-three percent in five weeks.

While the method and evaluation means by way of specific example have been limited to the evaluation of foliage which has been subjected to chemical treatment, the obscurimeter is considered to have utility in the evaluation of any change or process which can be reduced to black or white areas on a 35 mm. photographic film, e.g., the measurement of growth increments or rates of bacterial colonies on agar in petri dishes or other circular surfaces and the measurement of leaf areas on botanical studies.

Although I have described my invention with a certain degree of particularity, it is understood that the present disclosure has been made by way of example and that numerous changes in detail of construction and arrangement of parts may be resorted to without departing from the spirit and scope of the invention.

Having described our invention, we claim:

1. A method for the evaluation of the effectiveness of chemical compositions utilized in the defoliation of perennial plants comprising the steps of: selecting a representative test plot of forest, photographing an area of forest canopy and sky background at certain designated locations with the sky as a background to provide a film containing light and dark areas, chemically treating the test plot of forest with defoliant, repeat photographing the treated forest canopy with the sky as a background at the identical designated locations at periodic time intervals to produce a film containing light and dark areas, passing a beam of light through the photographic images of the treated and untreated test plots, impinging the transmitted light on a photoelectric cell to produce a current which is proportional to the ratio of light and dark areas on the film and measuring the produced current to give a value of percent defoliation.

References Cited

UNITED STATES PATENTS

| | | | |
|---|---|---|---|
| 1,199,980 | 10/1916 | Gilbreth. | |
| 1,592,407 | 7/1926 | Ybarrondo | 356—203 X |
| 2,406,716 | 8/1946 | Sweet | 356—202 |
| 2,409,358 | 10/1946 | Kaplan | 352—84 X |
| 2,725,782 | 12/1955 | Worley | 346—107 X |
| 2,910,340 | 10/1959 | Warrick | 353—84 X |
| 2,912,896 | 11/1959 | Allen et al. | 352—84 |
| 2,982,169 | 5/1961 | Enright | 356—202 X |
| 3,261,256 | 7/1966 | Morton. | |
| 3,288,109 | 11/1966 | Blumenfeld. | |

FOREIGN PATENTS 1,123,914  2/1962  Germany.

RONALD L. WIBERT, Primary Examiner

W. A. SKLAR, Assistant Examiner

U.S. Cl. X.R.

346—107; 352—38, 84; 356—202, 204, 205